United States Patent [19]
Colson

[11] Patent Number: 5,557,877
[45] Date of Patent: Sep. 24, 1996

[54] UNIVERSAL MOUNT FISHING ROD HOLDER

[76] Inventor: Kennie R. Colson, Rte. 8, Box 825, Murray, Ky. 42071

[21] Appl. No.: 531,318

[22] Filed: Sep. 20, 1995

[51] Int. Cl.⁶ .................................................. A01K 97/10
[52] U.S. Cl. ..................... 43/21.2; 248/512; 248/516; 248/518
[58] Field of Search ............................ 43/21.2; 248/512, 248/513, 514, 520, 521, 516, 518, 530; D22/147

[56] References Cited

U.S. PATENT DOCUMENTS

| | | | |
|---|---|---|---|
| 3,792,829 | 2/1974 | Fickett | 43/21.2 |
| 4,551,939 | 11/1985 | Kitchens | 43/21.2 |
| 5,295,321 | 3/1994 | Matura | 43/21.2 |
| 5,438,789 | 8/1995 | Emory | 248/514 |

FOREIGN PATENT DOCUMENTS 326090  1/1958  Switzerland ........................ 248/512

*Primary Examiner*—J. Elpel

[57] ABSTRACT

A universal mount fishing rod holder for holding a plurality of fishing rods in a position for use when fishing including a rigid planar base coupled to a tubular receptacle; a coupling mechanism for securing the base to an external recipient object; a rigid planar bar positioned above the base; an elongated support rod having one end removably coupled within the receptacle of the base and another end pivotally coupled to the bar; and a plurality of spaced and parallely aligned rod holders with each rod holder formed of an elongated rigid piece of wire having an anterior section with a generally v-shaped seat for holding a portion of a fishing rod, a posterior section with a loop for receiving an end of a fishing rod, and a central section extended therebetween and coupled to the bar.

5 Claims, 5 Drawing Sheets

UNIVERSAL MOUNT FISHING ROD HOLDER

BACKGROUND OF THE INVENTION

1. Field of the Invention

The present invention relates to a universal mount fishing rod holder and more particularly pertains to holding a plurality of fishing rods in a position for use when fishing with a universal mount fishing rod holder.

2. Description of the Prior Art

The use of fishing rod holders is known in the prior art. More specifically, fishing rod holders heretofore devised and utilized for the purpose of holding fishing rods are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,159,816 to Miyamae discloses a collapsible universal fishing rod holding apparatus. U.S. Pat. No. 4,901,970 to Moss et al. discloses a fishing pole holder with universally adjustable mount. U.S. Pat. No. 5,131,179 to McEwen discloses a dual fishing pole holder attached to a portable fish bucket. U.S. Pat. No. 5,163,244 to Rupp discloses a striking fishing rod holder. U.S. Pat. No. 5,295,321 to Matura discloses a self-gripping, self-balancing fishing rod holder.

While these devices fulfill their respective, particular objective and requirements, the aforementioned patents do not describe a universal mount fishing rod holder that can hold a plurality of fishing rods in an orientation for use when fishing.

In this respect, the universal mount fishing rod holder according to the present invention substantially departs from the conventional concepts and designs of the prior art, and in doing so provides an apparatus primarily developed for the purpose of holding a plurality of fishing rods in a position for use when fishing.

Therefore, it can be appreciated that there exists a continuing need for new and improved universal mount fishing rod holder which can be used for holding a plurality of fishing rods in a position for use when fishing. In this regard, the present invention substantially fulfills this need.

SUMMARY OF THE INVENTION

In the view of the foregoing disadvantages inherent in the known types of fishing rod holders now present in the prior art, the present invention provides an improved universal mount fishing rod holder. As such, the general purpose of the present invention, which will be described subsequently in greater detail, is to provide a new and improved universal mount fishing rod holder and method which has all the advantages of the prior art and none of the disadvantages.

To attain this, the present invention essentially comprises, in combination, a rigid planar square base with an inwardly threaded tubular receptacle coupled thereto at a central location and extended upwards therefrom. A coupling means is included for securing the base to an external recipient object. A rectangular rigid planar bar is included and positioned directly above the base. The bar has an upper surface and a lower surface. An elongated support rod is included and has one end threadedly coupled to the receptacle of the base and another end pivotally coupled to the lower surface of the bar. Three spaced and parallely aligned rod holders are included with each rod holder formed of an elongated rigid piece of wire having an anterior section, a posterior section, and a central section extended therebetween. The central section is coupled to the upper surface of the bar. Each piece has an upper end, a curved lower end, a first intermediate location, a second intermediate location, and a third intermediate location. Each piece also has generally L-shaped first segment having a horizontal lower leg connected with the lower end and a vertical upper leg connected with the first intermediate location, a second curved segment positioned in a vertical plane and connected between the first intermediate location and the second intermediate location to define a loop sized for receiving a free end of a fishing rod therein, a generally u-shaped third segment having a vertical short upper leg connected with the second intermediate location, a vertical long upper leg connected with the third intermediate location, and a horizontal cross leg extended therebetween, and a generally v-shaped sheathed fourth segment positioned in coplanar alignment with the loop and connected between the third intermediate location and the upper end to define a seat for holding a portion of a fishing rod therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved universal mount fishing rod holder which has all the advantages of the prior art fishing rod holders and none of the disadvantages.

It is another object of the present invention to provide a new and improved universal mount fishing rod holder which may be easily and efficiently manufactured and marketed.

It is a further object of the present invention to provide a new and improved universal mount fishing rod holder which is of durable and reliable construction.

An even further object of the present invention is to provide a new and improved universal mount fishing rod holder which is susceptible of a low cost of manufacture with regard to both materials and labor, and which accordingly is then susceptible of low prices of sale to the consuming public, thereby making such a universal mount fishing rod holder economically available to the buying public.

Still yet another object of the present invention is to provide a new and improved universal mount fishing rod holder which provides in the apparatuses and methods of the prior art some of the advantages thereof, while simultaneously overcoming some of the disadvantages normally associated therewith.

Even still another object of the present invention is to provide a new and improved universal mount fishing rod holder for holding a plurality of fishing rods in a position for use when fishing.

Lastly, it is an object of the present invention to provide a new and improved universal mount fishing rod holder a plurality of fishing rods in a position for use when fishing comprising a rigid planar base with a tubular receptacle coupled thereto; coupling means for securing the base to an external recipient object; a rigid planar bar positioned above the base; an elongated support rod having one end removably coupled within the receptacle of the base and another end pivotally coupled to the bar; and a plurality of spaced and parallely aligned rod holders with each rod holder formed of an elongated rigid piece of wire having an anterior section with a generally v-shaped seat formed thereon for holding a portion of a fishing rod therein, a posterior section with a loop formed thereon for receiving an end of a fishing rod therein, and a central section extended therebetween and coupled to the bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
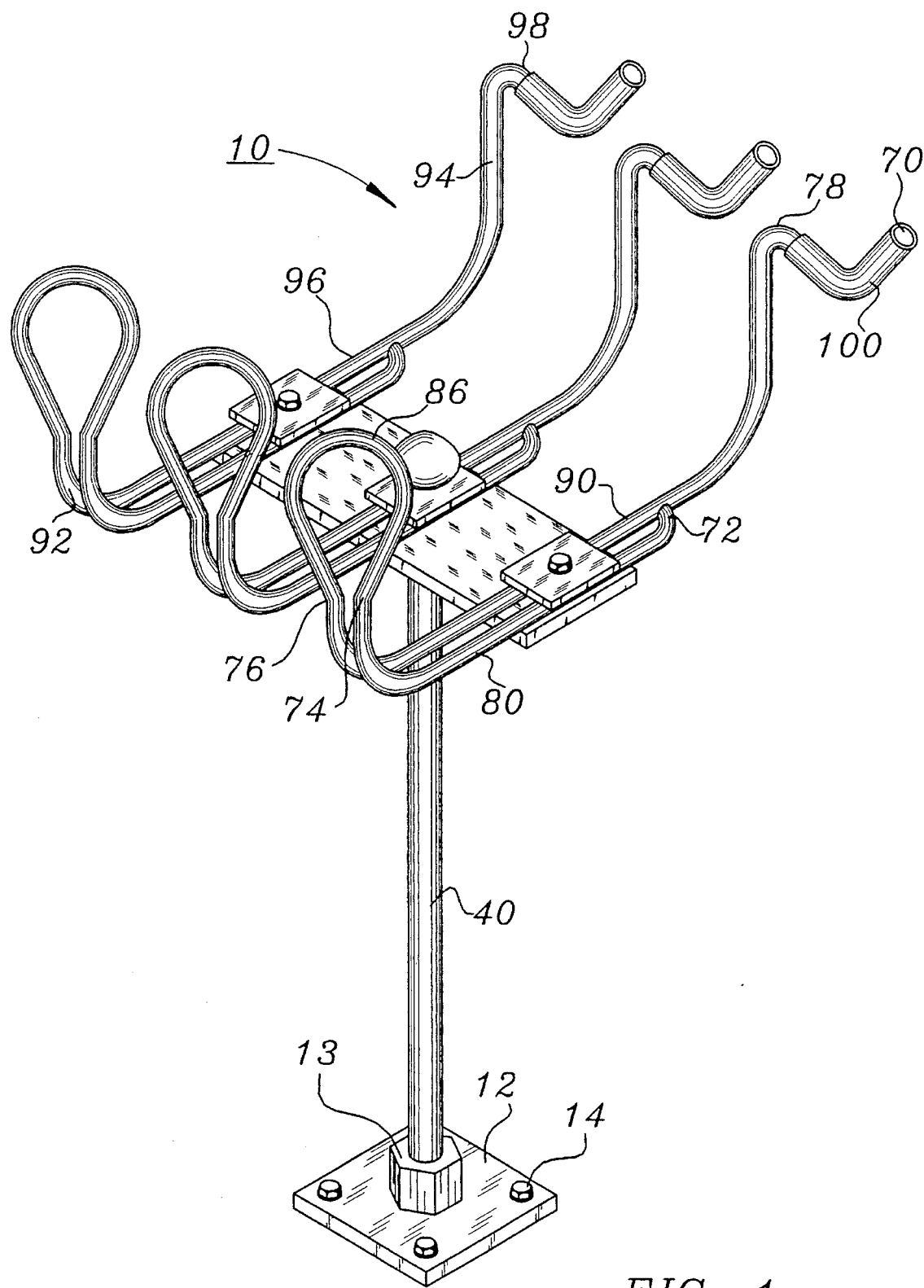
FIG. 1 is a perspective view of the preferred embodiment constructed in accordance with the principles of the present invention.
Figure 2:
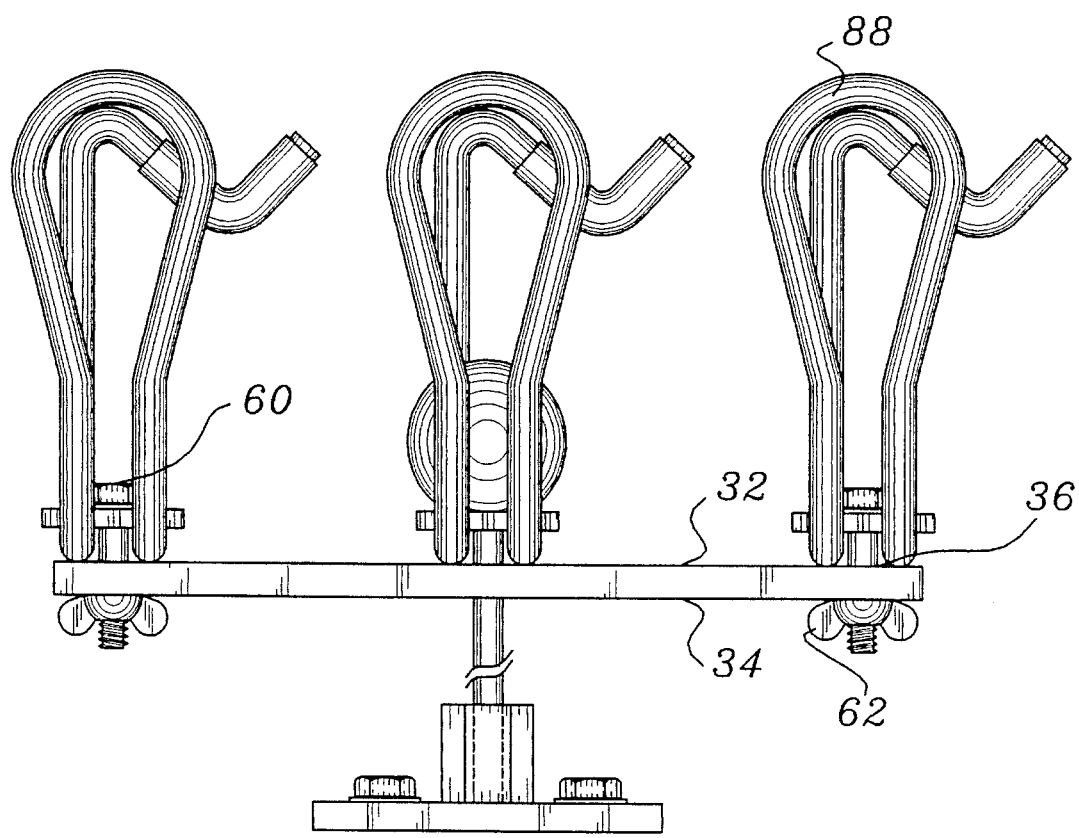
FIG. 2 is a side-elevational view of the present invention.
Figure 3:
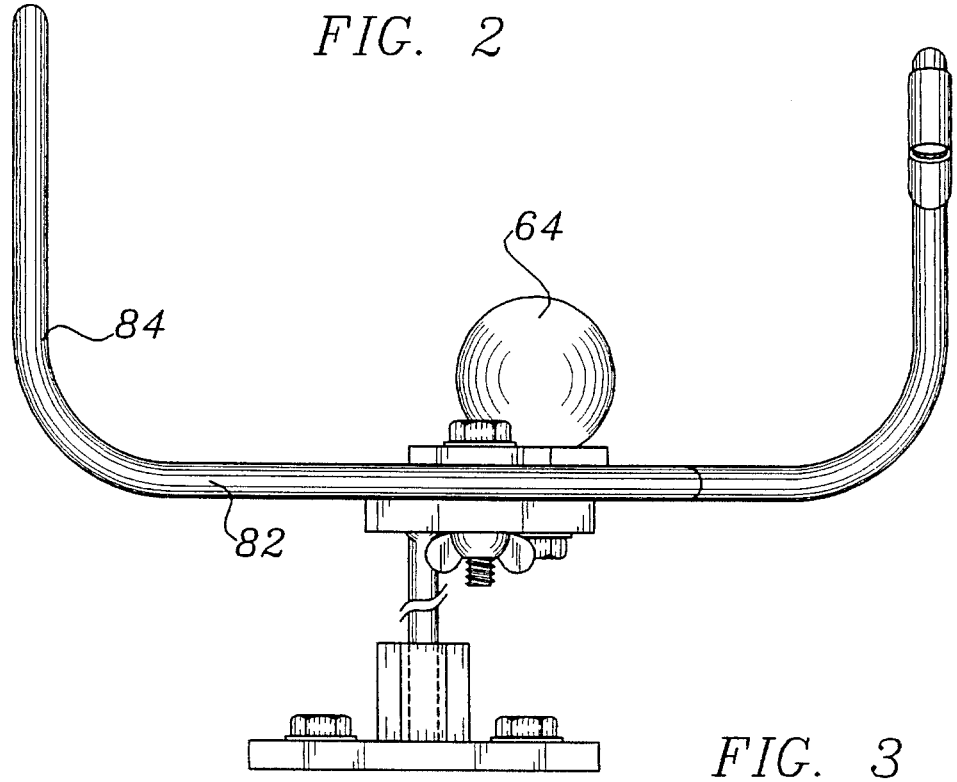
FIG. 3 is another side-elevational view of the present invention.
Figure 4:
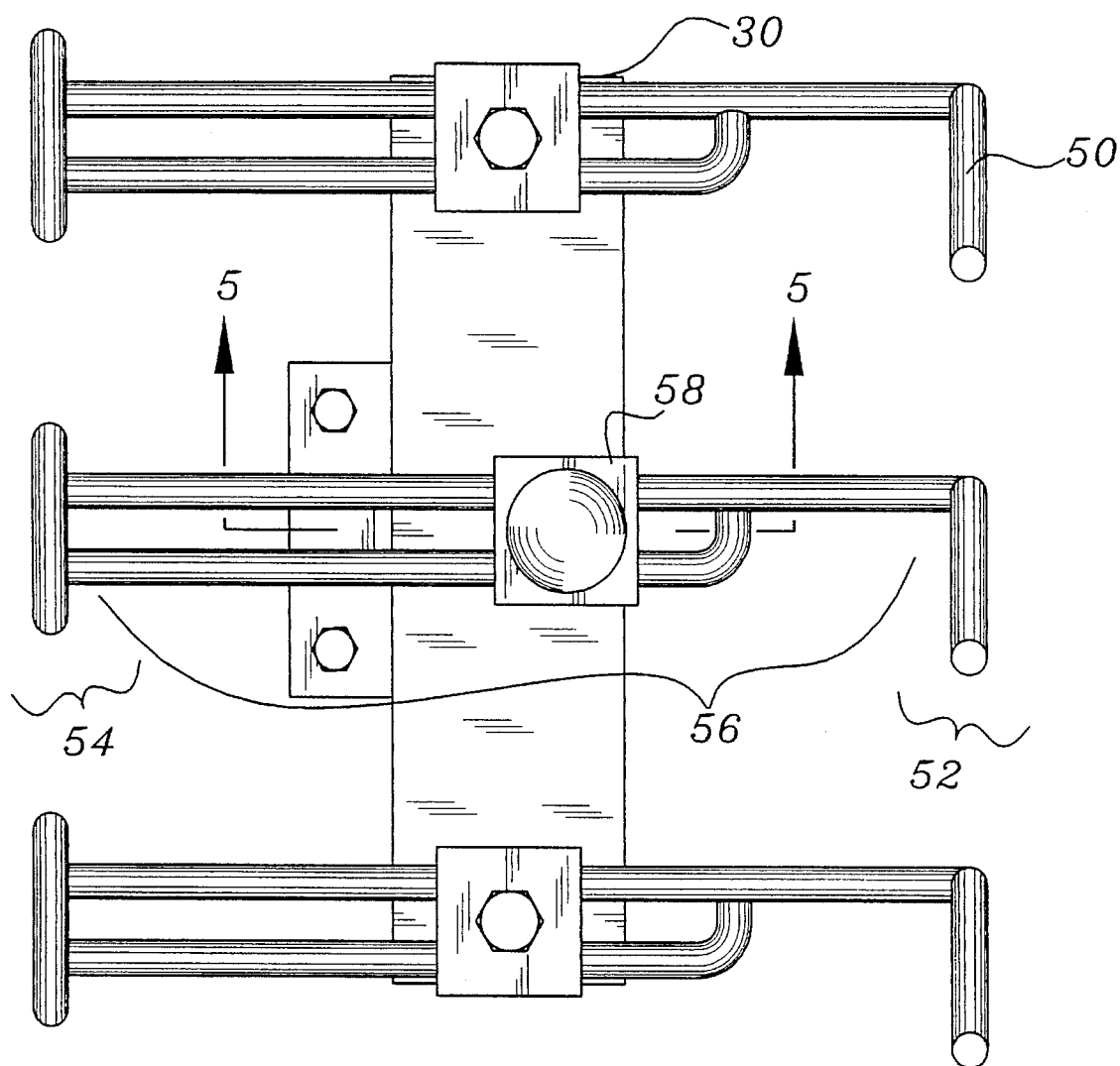
FIG. 4 is a plan view of the preferred embodiment of the present invention.
Figure 5:
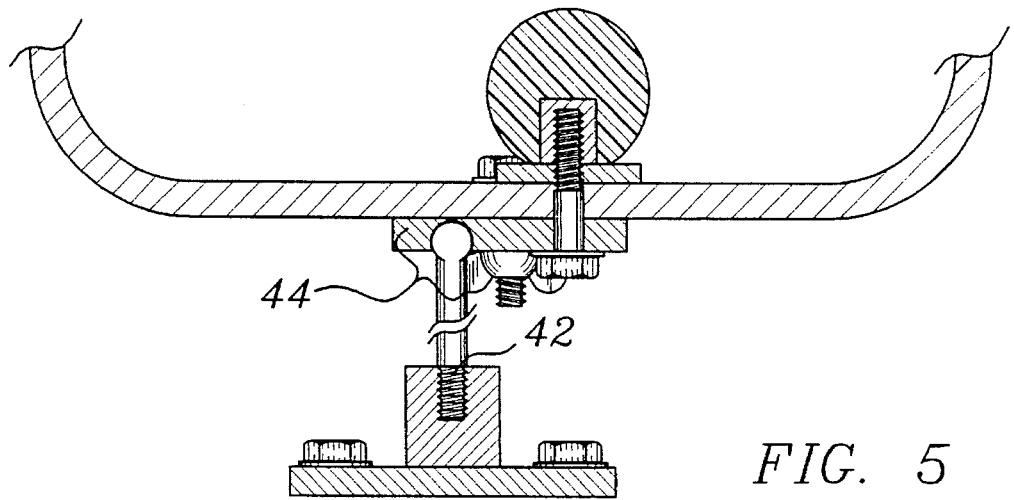
FIG. 5 is a cross-sectional view of the present invention taken along the line 5—5 of FIG. 4.

With reference now to the drawings, and in particular, to FIG. 1 thereof, the preferred embodiment of the new and improved universal mount fishing rod holder embodying the principles and concepts of the present invention and generally designated by the reference number 10 will be described.

The preferred embodiment of the present invention comprises a plurality of components. In their broadest context, such components include a base, base coupling means, a bar, a support rod, and a plurality of rod holders. Such components are individually configured and correlated with respect to each other to provide a structure used for holding a plurality of fishing rods in a desired position for use when fishing.

Figure 6:
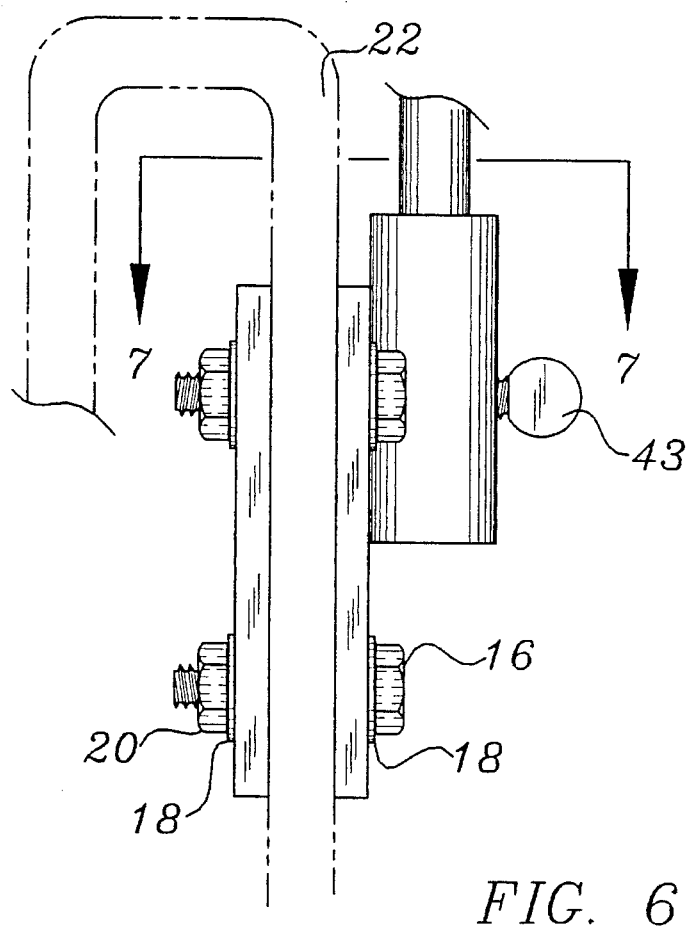
FIG. 6 is a view of a lower extent of the present invention when secured to a recipient object.
Figure 7:
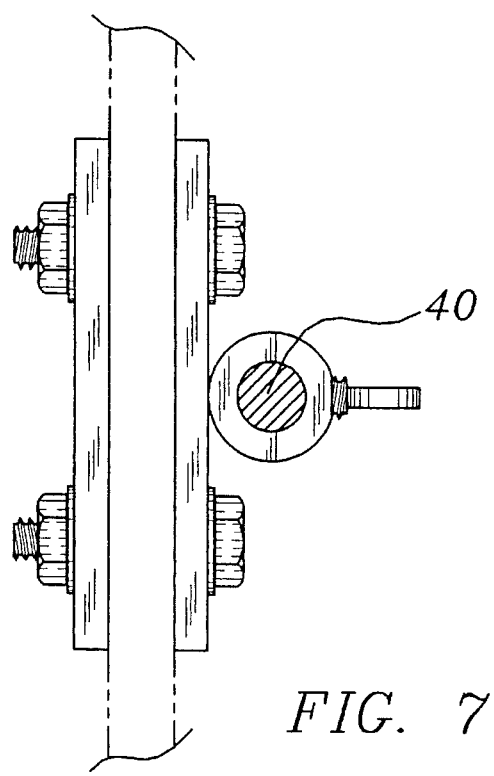
FIG. 7 is a cross-sectional view of the present invention taken along the line 7—7 of FIG. 6.

Specifically, the present invention includes a base 12. The base is planar and square in structure and formed of a rigid stainless steel material. The base has an inwardly threaded tubular receptacle 13 coupled thereto at a central location thereof. The receptacle 13 is extended upwards from the base 12 in perpendicular alignment therewith to form a top mount as shown in FIG. 1 or extended in a sidewards fashion and in parallel alignment therewith as shown in FIG. 6 to form a side mount. When both a side mount and a top mount are included, the present invention can be attached to a variety of objects on a boat. The receptacle has an inner diameter of about $\frac{3}{8}$ inches. The base also includes through holes 14 formed at each corner thereof having bolts 14 therein. In alternative the embodiments of FIG. 6, each through hole is sized for receiving a fastener formed of a bolt 16 secured with a washer 18 and hexagonal threaded nut 20. The fasteners are used for coupling the top mount to a deck of a boat or used for coupling the side mount to a generally vertical side wall 22 of a boat. A generally L-shaped rigid metal angle bracket can be used in lieu of the base to allow coupling of the support rod to corners on boats.

In the embodiment of FIG. 1–5, positioned directly above the base 12 is a bar 30. The bar is rectangular and planar in shape and formed of a rigid stainless steel material. The bar has an upper surface 32, a lower surface 34, and three through holes 36 formed thereon. The bar has a length greater than a side length of the base and a width less than the side length of the base.

An elongated cylindrical support rod 40 is provided. The support rod is formed of a rigid stainless steel material. A lower end 42 of the support rod is threadedly coupled to the receptacle 13 of the base 12 when used in a top mount configuration. The end 42 is further securable with a rigid metal thumb screw 43 when the support rod is used with a side mount as shown in FIG. 6. An upper end of the support rod is pivotally coupled to the lower surface of the bar 30 at a central portion thereof with a ball and socket joint 44. The ball and socket joint 44 allows the bar to be pivoted to place fishing rods in a desired orientation when fishing. Generally, the diameter of the support rod will vary with the type of fishing to be performed. For example, the support rod can be of a greater diameter when fishing for bass than when fishing for bluegill. Preferably, the support rod has a diameter of about $\frac{3}{8}$ inch. The support rod can also be fashioned in a plurality of removably couplable and axially aligned cylindrical sections that allow it to be extended to heights of 6 inches, 12 inches, or 18 inches.

Three spaced and parallely aligned rod holders 50 are included for holding three fishing rods for use. Each rod holder is fashioned to hold a single rod. Each rod holder is formed of an elongated rigid piece of stainless steel wire. The wire is formed in a shape that has an anterior section 52, a posterior section 54, and a central section 56 extended therebetween. The wire is formed of a rigid stainless steel material. The central section 56 is coupled to the upper surface of the bar 30 with a square planar stud 58 and a threaded bolt 60 extended through the stud and through hole 36. Bolt 60 can then be secured with a wing nut 62 or is covered with a black plastic knob 64 that allows hand adjustment of the rod holder by a user to a desired angle for use. As shown in FIG. 1, each piece of wire further has an upper end 70, a curved lower end 72, a first intermediate location 74, a second intermediate location 76, and a third intermediate location 78. A generally L-shaped first segment 80 has a horizontal lower leg 82, a vertical upper leg 84, and a bend therebetween. The lower leg 82 is connected with the lower end 72, and the upper leg 84 is connected with the first intermediate location 74. A curved second segment 86 is positionable in a vertical plane and connected between the first intermediate location 74 and the second intermediate location 76 to define a loop 88 sized for receiving a lower free end of a fishing rod therein. Furthermore, a generally U-shaped third segment 90 is included and has a vertical short upper leg 92 connected with the second intermediate location 76, a vertical long upper leg 94 connected with the third intermediate location 78 and a horizontal cross leg 96 extended therebetween. Lastly, a generally v-shaped fourth segment 98 is positioned in coplanar alignment with the loop 88 and is connected between the third intermediate location 78 and the upper end 70 to define a seat for holding an elongated portion of a fishing rod therein. The fourth segment is covered with an elastomeric sheath 100 that precludes a fishing rod from being scratched or damaged by rubbing directly against the fourth segment. Although only three rod holders are provided, additional rod holders could be added given a longer bar 30.

Figure 8:
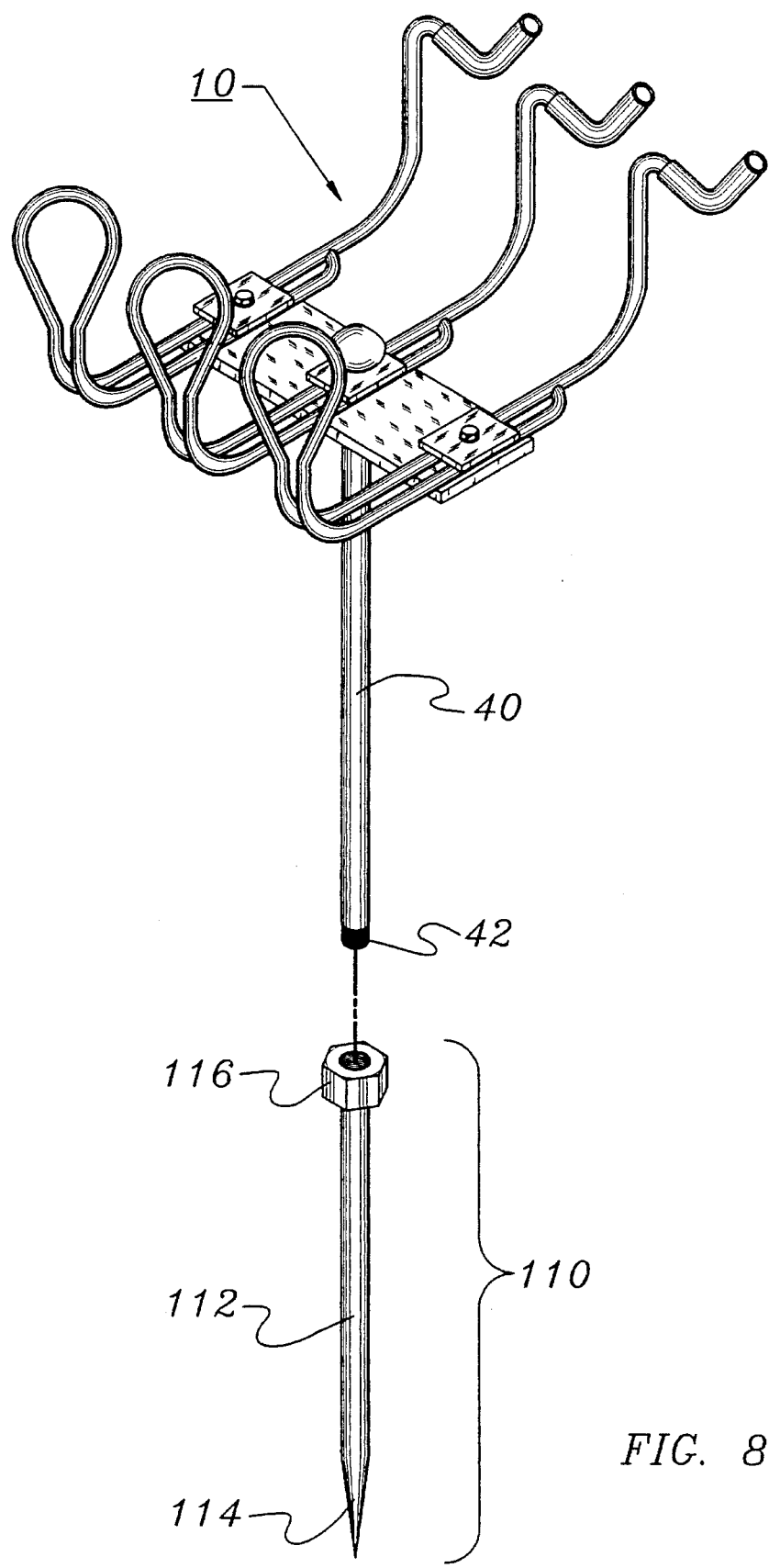
FIG. 8 is an exploded perspective view of an alternate embodiment of the present invention.

An alternate embodiment of the present invention is shown in FIG. 8. In this embodiment, an elongated piercing attachment 110 is used in lieu of base 12 for allowing the holder 10 to support fishing poles for shore fishing. Attachment 110 includes a rigid straight cylindrical pole 112 with a pointed lower end 114 and an upper end with an inwardly threaded coupling 116 affixed thereto. Coupling 116 is removably threadedly securable with threaded end 42 of rod 40. Lower end 114 pierces a ground surface when the attachment is driven into the ground, thereby placing the attachment in a fixed position. End 42 is then threaded to end 114. Attachment 110 allows conversion of the present invention from use on fishing vessels to use on a shore or bank. Preferably, the piercing attachment has a length of between about 8–10 inches.

The present invention is a multiple fishing rod holder that is attachable to boats and enables a single person to have up to three poles in the water at a time. The present invention comprises a pair of identical fishing rod holders, each of which supports 3 or 4 poles. Each has a 2.5 inch square base with a short threaded cylindrical receptacle into which is seated a 0.375 inch vertical support rod with a threaded end. The base has a thickness of about 0.25 inch. Affixed to the other end of the rod is a flat bar measuring about 12 inches in length by about 1.5 inches in width by about 0.25 inches in thickness. Three rod holders, equally spaced apart, attach to this bar. Each rod holder connects to the bar with a stud and threaded bolt that is covered with a knob or wingnut. The adjustable coupling of a rod holder with a stud and knob or wingnut enables such rod holder to be set at a preferred angle. The rod holders are made from metal wire with a loop at one end and a v-shaped segment at the other end. The base may be top, flush, or side mounted. Stainless steel or aluminum is the material of choice.

In use, the base is simply attached to the side of the boat in the desired place by inserting screws through four holes on the base. After the vertical rod is screwed into the base, a fishing pole is inserted into each of the holders. With one unit on each side of the boat, 6 rods are securely held. The fishing rod is inserted through the loop of the rod holder, while the v-shaped segment of the rod holder provides support. To change the angle of the rod, loosen the knob, pivot the rod holder, then tighten the knob. The present invention can be mounted to virtually any boat. With it installed on each side of the boat, a single person can have a large number of fishing rods in the water at the same time. This feature is invaluable when trolling. The present invention can be installed and removed quickly and easily.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A universal mount fishing rod holder for holding a plurality of fishing rods in a position for use when fishing comprising, in combination:

a rigid planar square base with an inwardly threaded tubular receptacle coupled thereto at a central location and extended upwards therefrom;

coupling means for securing the base to an external recipient object;

a rectangular rigid planar bar positioned directly above the base and with the bar having an upper surface, and a lower surface;

an elongated support rod having one end threadedly coupled to the receptacle of the base and another end pivotally coupled to the lower surface of the bar; and three spaced and rotatable rod holders with each rod holder formed of an elongated rigid piece of wire having an anterior section, a posterior section, and a central section extended therebetween and coupled to the upper surface of the bar, each piece of wire further having an upper end, a curved lower end a first intermediate location, a second intermediate location, and a third intermediate location, a generally L-shaped first segment having a horizontal lower leg connected with the lower end and a vertical upper leg connected with the first intermediate location, a curved second segment positioned in a vertical plane and connected between the first intermediate location and the second intermediate location to define a loop sized for receiving a free end of a fishing rod therein, a generally u-shaped third segment having a vertical short upper leg connected with the second intermediate location, a vertical long upper leg connected with the third intermediate location, and a horizontal cross leg extended therebetween, and a generally v-shaped sheathed fourth segment positioned in coplanar alignment with the loop and connected between the third intermediate location and the upper end to define a seat for holding a portion of a fishing rod therein.

2. A universal mount fishing rod holder for holding a plurality of fishing rods in a position for use when fishing comprising, in combination:

a rigid planar bar;

an elongated support rod having one end pivotally coupled to the bar; and a plurality of spaced and rotatable rod holders with each rod holder formed of an elongated rigid piece of wire having an anterior section with a generally v-shaped seat formed thereon for holding a portion of a fishing rod therein, a posterior section with a loop formed thereon for receiving an end of a fishing rod therein, and a central section extended therebetween and coupled to the bar.

3. The universal mount fishing rod holder as set forth in claim 2 wherein each wire rod holder includes an upper end, a curved lower end, a first intermediate location, a second intermediate location, and a third intermediate location, a generally L-shaped first segment having a horizontal lower leg connected with the lower end and a vertical upper leg connected with the first intermediate location, a curved second segment positioned in a vertical plane and connected between the first intermediate location and the second intermediate location to define a loop sized for receiving a free end of a fishing rod therein, a generally u-shaped third segment having a vertical short upper leg connected with the second intermediate location, a vertical long upper leg connected with the third intermediate location, and a horizontal cross leg extended therebetween, and a generally v-shaped sheathed fourth segment positioned in coplanar alignment with the loop and connected between the third intermediate location and the upper end to define a seat for holding a portion of a fishing rod therein.

4. The universal mount fishing rod holder as set forth in claim 2 and further comprising:

a rigid planar base with a receptacle coupled thereto and wherein another end of the support rod is removably coupled within the receptacle of the base; and coupling means for securing the base to an external recipient object.

5. The universal mount fishing rod holder as set forth in claim 2 and further comprising:

an elongated piercing attachment including a pole with a pointed lower end and an upper end with a coupling secured thereto and wherein another end of the support rod is securable to the coupling, and with the lower end of the piercing attachment drivable into a ground surface for holding the rod holders in a position for use.

* * * * *